US009186662B2

(12) United States Patent
Schmitz et al.

(10) Patent No.: US 9,186,662 B2
(45) Date of Patent: Nov. 17, 2015

(54) POSITIONING DEVICE AND METHOD WITH ROTARY INDEXING TABLE FOR MONOLITH-BASED AUTOMOBILE AND CHEMICAL CATALYSTS

(75) Inventors: Kai Schmitz, Buchholz (DE); Andreas Schulz, Hassbergen (DE)

(73) Assignee: BASF SE, Ludwigshafen (DE)

( * ) Notice: Subject to any disclaimer, the term of this patent is extended or adjusted under 35 U.S.C. 154(b) by 931 days.

(21) Appl. No.: 13/057,861

(22) PCT Filed: Jul. 31, 2009

(86) PCT No.: PCT/EP2009/059929
§ 371 (c)(1),
(2), (4) Date: Feb. 7, 2011

(87) PCT Pub. No.: WO2010/015573
PCT Pub. Date: Feb. 11, 2010

(65) Prior Publication Data
US 2011/0135833 A1   Jun. 9, 2011

(30) Foreign Application Priority Data

Aug. 6, 2008 (EP) ..................................... 08161892

(51) Int. Cl.
*B01J 37/02* (2006.01)
*B05C 3/09* (2006.01)
(Continued)

(52) U.S. Cl.
CPC ............ *B01J 37/0215* (2013.01); *B05C 13/02* (2013.01); *B01J 37/02* (2013.01); *B05C 3/09* (2013.01); *B05C 13/00* (2013.01); *B05C 13/025* (2013.01); *B05D 7/22* (2013.01)

(58) Field of Classification Search
USPC ............. 427/212; 118/50, 423, 428, 500, 503
See application file for complete search history.

(56) References Cited

U.S. PATENT DOCUMENTS 2,821,158 A * 1/1958 Lenz et al. ..................... 118/679
4,039,482 A * 8/1977 Hoyer et al. ................... 502/332
(Continued)

FOREIGN PATENT DOCUMENTS

CN   1368905    9/2002
JP   61-242643  10/1986
(Continued)

OTHER PUBLICATIONS

English Machine Translation of JP-08-103667, 28 pages. Date-Apr. 23, 1996.

*Primary Examiner* — Dah-Wei D Yuan
*Assistant Examiner* — Binu Thomas
(74) *Attorney, Agent, or Firm* — Servilla Whitney LLC

(57) ABSTRACT

The invention relates to a processing and positioning device for processing catalyst support bodies. The device comprises a rotary indexing table, which comprises a turntable, which is rotatable about a longitudinal axis running in the axial direction of the turntable, and at least one loading platform, which comprises a holding device and is set up for releasably holding the catalyst support body on an outer surface of the catalyst support body. The at least one loading platform is connected to the turntable, whereby the loading platform is taken along by the turntable when a rotation of the turntable takes place about its longitudinal axis. The holding device is arranged in relation to the longitudinal axis of the turntable with a radial distance away from the longitudinal axis. Also provided is at least one processing position, which is fixed with respect to the turntable and is away from the longitudinal axis in a radial direction by a distance. The distance is provided in relation to the radial distance such that the loading platform can be arranged at the processing position. The invention also relates to a method for positioning catalyst support bodies which, by means of a circular movement, arranges the support bodies at positions that are in series according to the positioning along a circular line.

7 Claims, 8 Drawing Sheets

(51) Int. Cl.
*B05C 13/02* (2006.01)
*B05C 13/00* (2006.01)
*B05D 7/22* (2006.01)

(56) References Cited

U.S. PATENT DOCUMENTS 4,609,563 A * 9/1986 Shimrock et al. ............... 118/50
6,455,097 B1 * 9/2002 Berclaz et al. ............... 118/406
6,478,874 B1    11/2002 Rosynsky et al.
2003/0003232 A1    1/2003 Rosynsky et al.
2007/0117303 A1    5/2007 Komori et al.

FOREIGN PATENT DOCUMENTS

| JP | 08-103667 | 4/1996 |
| JP | 2003-506211 | 2/2003 |
| JP | 51-79692 | 4/2013 |

* cited by examiner

POSITIONING DEVICE AND METHOD WITH ROTARY INDEXING TABLE FOR MONOLITH-BASED AUTOMOBILE AND CHEMICAL CATALYSTS

PRIORITY

Priority is claimed as a national stage application, under 35 U.S.C. §371, to PCT/EP2009/059929, filed Jul. 31, 2009, which claims priority to European application 08161892.8, filed Aug. 6, 2008. The disclosures of the aforementioned priority applications are incorporated herein by reference in their entirety.

FIELD OF THE INVENTION

The invention relates to the field of the manufacture of monolith-based automobile and chemical catalysts and in particular to the processing and positioning of support bodies in order to coat them with catalyst material. Used as support bodies are monolithic, i.e. one-part, catalyst bodies, which are provided as a whole with a housing and passed on for their use. In particular, the invention relates to the positioning between different processing positions.

PRIOR ART

It is known to process support bodies individually, by various working steps being performed on a support body. These processing steps on the catalyst support body concern the coating by introducing catalyst material, which is fed to the catalyst support body for example as a slurry, the blowing out, in which the catalyst body is subjected to a pressure gradient in order to blow excess catalyst material out of the catalyst support body after the coating, and a weighing station, with which the catalyst body can be weighed (before or) after the coating, in order to check the coating efficiency. Furthermore, drying steps and unloading and loading steps are known.

It is also known to carry out these steps by means of separate stations, the support bodies being transported for this purpose along a straight line by means of a longitudinal conveying device. According to the prior art, conveyor belts, in particular conveyor belts comprising chain links, are used as the conveying device, in order to be able to move even heavy molded bodies precisely. Conveyor belts are formed as a continuous loop and are set up by means of two spaced-apart deflecting rollers, so that a straight transporting path is obtained. The mechanics of such transporting belts is relatively complex, in particular in the case of maintenance, and with the deflecting axes there is one-sided loading, since the deflecting axes exert an outwardly directed stress on the conveyor belt.

In order to ensure external access, the processing stations are arranged primarily within the circulating transporting belt. Since a continuous connection to the conveyor belt is not possible on account of the pattern of movement of the latter, complex mechanisms must be used for gripping/turning the support bodies. Moreover, the pneumatic, hydraulic or electrical coupling of tool parts that are fastened to the belt is difficult on account of the deflected rectilinear movement. Finally, for the stated reasons of complex coupling, the transporting path at the deflecting points remains unused, this also being the case for reasons of mechanical stability of the conveying means. In particular, the lack of a possibility of connection between a control station and the moving holding platforms reduces the flexibility of the arrangement and makes handling of the support bodies more difficult.

Due to the setup between the deflecting axes, a conveyor belt running in a horizontal plane is unstable in the vertical direction, in particular in the middle between the deflecting axes. It is therefore necessary either to dispense with vertical movements of the tools or to take special measures to ensure the stability of the conveyor belt during vertical movements of the tools fastened to them. In particular, adaptation of the height of the loading platform to different support body dimensions or processing heights of the stations is consequently not readily possible.

In principle, the activation and monitoring of a conveyor belt involves a large number of sensors and actuators, since the circulating conveyor belt has a different kind of movement and different mechanical stability characteristics at the deflecting rollers than between the deflecting rollers, and corresponding actuators and sensors are adjusted for the respective type of movement.

To sum up, the mechanisms known from the prior art for the processing and positioning of catalyst support bodies entail increased complexity as well as limitations.

It is therefore an object of the invention to provide simplified processing and positioning mechanisms for catalyst support bodies.

SUMMARY OF THE INVENTION

The aforementioned object is achieved by the concept on which the invention is based, according to which a catalyst support body to be processed is transported between the various processing positions by means of a complete rotating movement or a rotating movement extending only over one circumferential portion. A transporting movement, proceeding within a circular ring, between fixed processing positions can be provided by a simple mechanism. According to the invention, the transporting movement between processing positions is carried out in order to transport the catalyst support body from one processing position to another. The positioning movement of the catalyst support body is consequently based on a rotation of a turntable about its axis of rotational symmetry/longitudinal axis, the support body being arranged outside the axis of rotation of the turntable, or at least the longitudinal axis of the support body being at a distance from the axis of rotation, to displace the support body from one position to another position. The rotary body is consequently transported along a circumference, i.e. on a closed curve, which lies within a circular ring or which is itself circular.

Although in principle the positioning movement of the support body may also comprise movements in a radial direction (with respect to the turntable), for example in order to move the support body toward the turntable or away from it, in order to allow for the different distances between the axis of rotation and the processing station, the main movement on which the positioning is based comprises a rotation that is performed by a turntable, the support body being moved by a distance (preferably fixed or variable by a movement carried out in a radial direction). In order to make an adaptation in a radial direction possible, according to the invention the support body is moved within a circular ring, it being possible to use a movement in a radial direction, i.e. from the inside diameter of the circular ring to the outside diameter of the circular ring or vice versa, for the purpose of adapting the distance of the support body from the axis of rotation to a distance of a processing position from the axis of rotation. However, there is a particularly simple configuration in which the rotary body merely performs a rotating movement, without the distance of the loading platform or the support body from the axis of rotation that is provided by the turntable changing. The constant radial distance has the effect for example of obviating the need for a radial actuator, which would move the support body in a radial direction in addition to the rotation performed by the turntable. Such a radial actuator may, if appropriate, be fastened to the turntable and connects a holding device, provided for the support body, to the turntable.

According to the invention, at least two, and preferably all, processing positions are arranged around the turntable at different angular positions, the support body being taken past the processing positions by the rotating movement that is brought about by the turntable. In other words, the processing positions which are provided by the processing stations lie in the circular ring or, with a fixed distance between the support body and the turntable axis, on the circle that corresponds to the path of movements of the support body. In principle, the support body can be displaced in a direction parallel to the axis of rotation, for example by means of a lifting device, although the described movement of the support body (i.e. circularly or along a closed path within a circular ring) relates to a projection plane that is perpendicular to the axis of rotation of the turntable. In other words, the circular movements or movements within a circular ring described above are only one aspect of the spatial movement of the support body, and relate to a representational plane that extends perpendicularly to the axis of rotation. The overall movement, i.e. the spatial movement of the support body, is obtained by the circular movement or movement within a circular ring described above in combination with a lifting movement perpendicularly to this rotating movement.

The concept on which the invention is based considers substantially only the component of the movement of the support body that is brought about by the turning of the turntable, and not the complete three-dimensional spatial movement that is obtained by the combination of the rotations with possible lifting movements in the direction of the axis of rotation of the turntable. The concept on which the invention is based of moving a support body by rotation between processing positions about an axis of rotation away from the support body is implemented by a processing and positioning device which substantially comprises a rotary indexing table with a turntable, a loading platform being fastened to the turntable away from the axis of rotation of the turntable, and the loading platform being intended for loading with a support body. For this purpose, the loading platform preferably takes up a holding device, which can hold the catalyst support body from the outside, i.e. on an outer surface of the catalyst support body. The holding device is consequently set up for gripping the catalyst support body, holding it (in particular during the movement) and passing it on again (at a new position), by the holding device releasing the support body. It substantially implements the underlying concept by the loading platform being provided outside the axis of rotation of the turntable, and consequently a rotation of the turntable taking the loading platform with it along a circle or along a circumferential path within a circular ring. As a result, the support body can be transported from one position to a further position by the rotation, the corresponding positions being arranged at different angular positions around the turntable. The turntable itself is preferably turned about its longitudinal axis, which passes through the center of gravity of the turntable, and corresponds to the axis of rotation. The turntable is consequently turned about the axis of its rotational symmetry. The turntable is preferably rotationally symmetrical, for example in the form of a circle, a regular polygon or an oval. The holding device is fastened to the outer rim or in the vicinity of the outer rim of the turntable and is consequently automatically arranged with a radial distance away from the longitudinal axis of the turntable about which the turntable is turned.

Individual processing positions are respectively provided by processing stations, each processing station providing at least one processing position (for example a weighting station at which only one function, namely the weighing of the support body, is provided). Processing stations may provide more than one, for example two, processing positions, for example a loading and unloading station, which provides on the one hand the processing position of loading and on the other hand the processing position of unloading at the same location. Generally, the processing stations provide processing positions which are at the height of the holding platform or the turntable, or which are offset by a distance in the direction of the axis of rotation in relation to the plane in which the turntable or the associated holding device extends. Height adaptations that may be necessary can be performed by means of a lifting device (for example a spindle drive), which moves the loading platform along the direction of the axis of rotation. The processing stations are set up around the turntable, for example at the same distance in relation to the axis of rotation of the turntable, it being ensured that the processing positions lie at the locations at which the holding devices can be arranged. In other words, the support bodies are arranged in processing range of the processing stations by means of the holding device and the turntable.

A processing station comprises a receptacle, into which the catalyst support body can be arranged by means of the holding device in order to be processed there. The receptacle provides the processing position. The processing station is therefore preferably open toward the turntable and similarly in both tangential directions that the holding device performs during the rotation of the turntable. The processing station also comprises devices which are necessary for the processing of the support body, as explained in more detail below on the basis of examples. Firstly, however, further features of the invention that concern the positioning of the support body are described.

According to a further configuration of the invention, the positioning device according to the invention comprises a lifting device, with which the catalyst support body can be displaced in the direction of the axis of rotation of the turntable. If the rotary indexing table and the turntable are oriented horizontally with their longitudinal axis, the lift provided by the lifting device corresponds to a displacement in the vertical direction. The lifting device is preferably connected to the turntable and displaces the loading platform in the direction of the longitudinal axis. Consequently, the turntable is connected to the loading platform by way of the lifting device. In an alternative configuration, the loading platform is connected to the turntable, the lifting device displacing the support body in the direction of the longitudinal axis, the lifting device comprising a holding device for the rotary body. Preferred, however, is an embodiment in which the lifting device is moved along with the turntable, is connected to the turntable and holds the catalyst support body by way of the loading platform and a holding device provided on the loading platform.

In a further, particularly preferred embodiment, the positioning device comprises a pivoting device, with which the catalyst support body can be pivoted about a pivot axis. The pivot axis is preferably perpendicular to the axis of rotation or longitudinal axis of the turntable, i.e. lies parallel to a plane in which the support body is moved (for the case where vertical lifting displacements are not considered or not performed).

The pivot axis may also be inclined to this plane, the amount of the angle of inclination preferably being less than 45°, less than 30°, less than 10° or less than 5°. With respect to the longitudinal axis, the inclination is substantially 90°, 85°-95°, 80°-90°, 60°-120° or 45°-135°.

A pivoting device allows the changing of the position of the catalyst support body and consequently an adaptation to a respective processing station, which processes the support body in a specific position. The pivoting device is preferably fastened to the turntable and to the loading platform in order to connect the latter rotatably to one another and in order to pivot/turn the loading platform with respect to the turntable in the way described above. Alternatively, the pivoting device may also be attached to the loading platform, which is connected to the turntable, in order in this way to turn the holding device with respect to the loading platform and the turntable. Preferred, however, is an arrangement of the pivoting device between the turntable and the loading platform in order to pivot the loading platform with respect to the turntable.

The pivoting device described above may be combined with the lifting device described above, i.e. the lifting device may be connected to the turntable by way of the pivoting device, and the pivoting device may be connected to the turntable by way of the lifting device. If the lifting device is connected to the turntable by way of the pivoting device, the loading platform may be connected to said lifting device, or the loading platform may be provided on the pivoting device, which is connected to the turntable by way of the lifting device. The connections which connect these elements to one another are releasable/re-connectable or unreleasable; a releasable mechanical connection is preferably also provided between the turntable and the holding device.

The loading platform is preferably connected to the turntable by way of a releasable and unreleasable mechanical connection, it being possible for the loading platform to be connected to the holding device directly, and the loading platform itself is connected to the turntable directly by way of a releasable connection or preferably connected to the turntable indirectly by way of the lifting device and/or the pivoting device, and the loading platform itself together with the holding device can be separated from the rest of the positioning device by way of the releasable mechanical connection. In a particularly preferred configuration, the pivoting device is fixedly connected to the turntable and the pivoting device is releasably connected to the holding device. Suitable as the connection are generally force-transmitting or torque-transmitting mechanical connections, for example positive, integral or nonpositive connections such as flanges, screw connections, plug-in connections or plug-in connections with releasable latching elements which can be separated by releasing a latching device loaded with spring force and can be closed by simple insertion and engagement. Consequently, the loading platform can be removed individually from the turntable and connected by a quick-action closure (for example a plug-in connection with latching) to the turntable directly or by way of a pivoting device, for example for maintenance purposes.

The positioning device may comprise one, two or more loading platforms (preferably an even number), which are connected to the turntable directly or indirectly, for example loading platforms arranged in pairs which lie opposite one another and at the same time are provided at processing stations which have the same function. If more than one loading platform is used, they preferably have the same angular distance from one another.

The loading platform comprises a holding device, which is configured for example as an actuable clamping element. The holding device preferably comprises a releasable holder, which controllably holds, picks up or releases an object. The holding device, and for example the releasable holder, comprises at least one contact surface, which is provided for the contact with the object, in order to clamp or hold the object. Furthermore, the holding device preferably comprises an anchor element, which moves the holding surface and consequently can change the clamping state of the object. The loading platform comprises for this purpose an object position, preferably within the holding device on which the contact surface is provided, it being possible for the content surface to be moved toward the object position or away from it. The movement of the contact surface is preferably performed by an actuator element of the loading platform (or of the holding device). The actuator element may in principle be hydraulically, pneumatically or electrically driven and the respective form of energy converted into a movement or a pressure. The contact surface may clamp the object, by the contact surface being moved toward an opposing fixed surface, the contact surface firmly holding the object, i.e. the catalyst support body, by pressure toward the fixed surface. A further embodiment provides two contact surfaces, which lie opposite one another and are preferably moved at the same time toward the object position or at the same time away from it, in order in this way to hold the object between them or release it. The contact surface preferably has the shape of a narrow, continuously formed strip, which extends along the form of a circle, an oval, a polygon or along any desired continuous path defined by the circumferential shape of a molded body. The contact surface may be made to extend virtually as desired, for example in the form of a straight line or an arcuate line, the straight or arcuate line having a certain width in order to exert the pressure on the object at least partially homogeneously. According to a further embodiment, the object surface surrounds the object position completely or over more than half a circumference, in order in this way to clamp the object when it moves toward the center of the object.

Preferably used as the actuator element is a bellows, i.e. a continuously formed envelope with access to the inner volume of the envelope, the envelope being flexibly or elastically provided. By introducing fluids into the bellows through the access, it expands, whereby the contact surface moves toward the object position, and the object, i.e. the catalyst support body, is arrested or clamped. Clamping of the support body on an outer surface of the support body is preferred, preferably on a cylindrically running outer surface of the support body, the holding force alone substantially preventing the support body from falling out of the holding device. Furthermore, gripping elements with special spatial shapes of the contact surface, which engage in corresponding, complementary gripping surfaces of the catalyst support body and consequently establish a positive contact over at least one surface, may be provided.

In a further embodiment, the holding device or the actuator element comprises a gripper with a gripping surface which provides the contact surface that is used for clamping the support body. The gripper can consequently preferably move the corresponding gripping surface or contact surface toward the object position and away from it, the gripper preferably providing two opposing contact surfaces, or the gripper being provided as a fixed surface of the holding device, and the gripper providing a contact surface which can be moved toward the fixed surface by means of the gripper. The gripper may, in principle, be operated electrically, hydraulically or pneumatically.

In the particularly preferred embodiment in which the actuator element comprises a bellows, the bellows has an access which can be introduced into a corresponding recess in the loading platform. The holding device is preferably formed from inelastic material, for example from plastic, and in particular from aluminum or from steel. The bellows lies in a continuously formed frame, which is formed by the loading platform and has at one point an opening which is provided by the access. The access is preferably connected fluid-tightly to the recess which is provided in the holding device, so that a medium can be fed into the interior of the bellows by way of the fluid-tight connection and to the access from outside the loading platform. In the same way, the pressure inside the bellows can be checked or medium let out from the bellows by way of this connection. The bellows is preferably formed as a tube which is continuously formed and the inner space of which can be provided with medium by way of the access. As already noted, fluids, in particular air or a liquid such as oil or water, are suitable as the medium. The frame within the loading platform is preferably continuously formed, i.e. forms the periphery of a recess in the holding device into which the support body can be introduced and in which the object position lies. The inner surface of the frame serves the bellows as a counter-bearing and, if part of the inner surface is not covered by the bellows, can be used as a counter-bearing for opposing contact surfaces. In this case, a portion of the part of the frame that is not covered by the bellows comprises a cushion element which is fastened to the frame, is elastic and forms the counter-bearing with respect to the contact surface. The frame preferably sets up a fluid connection, which can be connected to the access, the fluid connection also preferably being connected to a channel which runs for example on or in the loading platform and by way of which medium can be supplied to the bellows or taken away from it. With preference, the channel of the loading platform is connected fluid-tightly, preferably by way of channel leading through the pivoting device, to a channel of the turntable or of the rotary indexing table, so that for example an externally arranged fixed compressed air source can be individually connected to the bellows by way of the channels, in order to control the pressure on the bellows individually according to a valve position for each loading platform of the loading platform. In the same way, further channels, which run individually and make individual activation of all the pivoting devices of the device possible, may be provided.

An advantageous embodiment of the invention comprises a quick gripping or quick release connection, which (releasably) connects the holding device with the turntable, and in particular releasably connects the holding platform with the holding platform, into which the holding device is fit into. Preferably, the holding device is comprised by the bellows described herein. The quick release connection comprises a slidable operating element, which locks the holding platform to the turntable in a first position and releases the holding platform from the turntable in a second position. The slidable operating element is adapted to be operated by a movement of the operating element between the first and the second position. This movement can be a rotation or a translation, in particular a translation in a direction perpendicular to the radial direction of the turntable or in the direction of the movement of the turntable.

Advantageously, the quick release connection combines a mechanical quick release connection between turntable and holding platform/holding device and a pneumatic, hydraulic or electrical quick release connection between turntable and holding platform/holding device. The pneumatic, hydraulic or electrical quick release connection is also denoted as control connection, which controls the actuation of the holding device. In a particular embodiment, the control connection comprises a pipe element providing the access or connected to the access, wherein the pipe element is connected to the holding platform and is in fluidic connection with the holding device (or the access thereof), the holding device being provided as pneumatic or hydraulic actuator, e.g. a bellows. The pipe element is connected with the holding platform by a bonded connection, a press fit, or, most preferably, by a screw connection. Such a connection is located within a corresponding recess within the holding platform. Further, the pipe element is partly received within a corresponding recess in the holding platform. The remaining part of the pipe element extends from holding platform towards the turntable. In a position, in which the holding platform is locked to the turntable, the remaining part extends through a quick release locking element connected to and being operatable by the operating element. Thus, when moving the operating element, the locking element connected thereto locks or releases the quick release connection, only the mechanical quick release connection or only the control connection. In a position, in which the holding platform is locked to the turntable, the remaining part is also connected to a turntable connecting element mounted at the turntable.

In case of a pneumatic or hydraulic connection, the turntable connecting element is provided as a pipe adapted to receive at least an end of the remaining part. In case of an electrical connection, the turntable connecting element is provided as a sliding contact element complementary to a sliding contact connected to the holding platform. Preferably, the components of the control connection coaxially extend within the mechanical connection. In case of a pneumatic or hydraulic connection, the locking element urges a section of the turntable connecting element (e.g. in form of a pipe), which extends towards (and partly extends within) the loading platform, towards at least an end section of the of the remaining part of the pipe element (which at least partly extends within a corresponding recess of the turntable). In particular, in a locked position, the end of the remaining part is plugged into the turntable connecting element, establishing a fluidic connection, wherein the locking element presses the end of the remaining part into (or onto) the turntable connecting element. When operating the quick release connection (in particular the control connection) by moving the operating element, the locking element decreases (removes) or increases (exerts) the pressure connecting the turntable connecting element and the remaining part. The locking element can comprise an opening tapering towards the operating element. The location at which the remaining part joins the turntable connecting element lies within this opening. Thus, when the operating element is moved away from the quick release connection, the section of the opening at this large and does not provide an pressure on the control connection. However, when moving the operating element towards the quick release connection, the opening is narrow and exerts pressure on the control connection. In an exemplary embodiment, the opening is V-shaped. In another exemplary embodiment, the opening is defined by two circles having distinct sizes and which are overlapping, e.g. a large circle, in which the centre of another, smaller circle lies. The size of the smaller circle is suited to result in pressure exerted onto the control connection (enabling a tight fluidic connection between remaining part and turntable connecting element). The size of the larger circle is not suited to result in substantial pressure exerted onto the control connection (enabling the separation of remaining part and turntable connecting element with reasonable force).

Preferably, the control connection and the mechanical connection are operated by the same operating element.

Further, in case of a pneumatic or hydraulic quick release connection, this connection comprises an O-ring sealing or similar, which enables rotation of the holding platform in relation to the turntable without breaking or affecting the fluidic connection between holding device and turntable. However, also without an O-ring sealing, the rotation can be carried out without affecting the fluidic connection due to the elasticity of the control connection, the pipe element and the turntable connection element since at least one of these components is made of elastic material, e.g. rubber or silicon suitable to withstand deformations like torsions. An external control element, e.g. a switchable compressed-air source, can be connected to the turntable connection element, e.g. via additional pipe connections and plugs. The turntable connection element is suited to be connected to such an external control element, e.g. by providing a connecting plug element. Preferably, all holding platforms of the inventive apparatus are provided with such a quick release connection, each of the platforms being connected by individual control connections.

In case of an electrical quick release connection, the control connection comprises a wire connection having a sliding contact, the wire connection connecting a control device external to the holding platform with the holding device, the holding device being provided as a electromechanical actuator.

The processing and positioning device according to the invention preferably comprises a positioning distance (or positioning device) as described above on the basis of the turntable, the loading platform, the holding platform and further associated elements. In addition, the device according to the invention comprises processing portions which are provided in the form of processing stations. The following may be provided as a processing station: a weighing station, which determines the weight of the support body, a coating chamber, with which catalyst material is introduced into the support body, a blowing-out station, with which excess catalyst material within the support body can be removed from it, and a loading and unloading station, with which the positioning device can be loaded, or with which the processed support body can be unloaded into a receptacle. Detailed examples of these stations are explained in more detail in the description of the figures and in the associated figures.

A weighing station preferably comprises a force sensor, to which the support body can be connected in order to sense the force of the weight of the support body. For this purpose, the force sensor is preferably connected to the support body by way of a holder, for example said support body may be suspended from the holder. Furthermore, the weighing station may comprise a weighing dish or weighing plane onto which the support body is placed. During the determination of the weight of the support body, there are preferably no further mechanical force-dissipating connections between the support body and the processing station or positioning device.

A coating station preferably comprises two (or more) parts, it being possible in the case of a two-part configuration for a two-part housing to be provided, with which a closable chamber can be formed. The support body can be introduced into the chamber when the two housing parts are not connected to one another, whereupon the housing parts are preferably connected to one another by joining the housing parts, or one housing part and a closing element, together, for example by pressing, so that the coating chamber is closed off from the surroundings. The housing used for coating preferably also comprises a feeding device (and also an outlet), the feeding device flowable catalyst material (i.e. preferably a slurry with catalyst particles or a liquid) being provided and at the same time introduced into the support body by absorption. The introduction is provided by means of a pressure generating means, which builds up a negative pressure in the support body and absorbs catalyst material that is contained in a trough into the support body, or subjects the catalyst material to pressure and forces it into the chamber. Consequently, a pressure equalization is provided, whereby a pressure gradient is obtained, and consequently a flow of the catalyst material into the support body. The pressure generating means may either exert pressure on the catalyst material directly in order to force the latter into the chamber, generate a negative pressure in order to absorb catalyst material into the molded body, or force the catalyst material into the chamber indirectly by generating a gas pressure. With preference, a two-part configuration comprises an upper vacuum hood and a lower immersion pan, which provides a trough for catalyst material. The loading platform comprises a sealing outer (elastic) layer, onto which the vacuum hood is pressed. The chamber is provided by the vacuum hood and the loading platform. The trough is arranged at a lower end of the support body.

An associated blowing-out station comprises a blowing-out chamber, which may be formed in a way similar to the coating chamber. The blowing-out chamber consequently comprises an opening in order to receive the catalyst support body, preferably by a two-part form of a housing of the blowing-out chamber, it being possible for the two housing parts to be separated from one another in order to receive the support body and closed in order to form the closed blowing-out chamber. The blowing-out chamber may also be provided such that it is open at one end, in order to arrange there an end of the support body at which excess catalyst material escapes. Preferably, a pressure generating means is similarly provided at the closed end of the blowing-out chamber, for example for the generation of a positive gas pressure, whereby a gas pressure gradient is obtained, with which a catalyst support body connected to the pressure generating means can be freed of excess catalyst material. The resultant flow of the catalyst material preferably leads into a collector. The blowing-out chamber preferably comprises connection devices, for example an elastic skirt, in order to connect a housing part and the pressure generating means to the catalyst support body or to an upper sealing outer layer (as described above) of the holding device. The positive pressure is applied to an upper end of the support body, which protrudes into the chamber, and excess catalyst material escapes at the lower end of the support body into the collector, which is provided by a further housing part.

The blowing-out station and also the coating station may also comprise lifting and lowering elements, which can be used for opening the chamber, closing the chamber, connecting the pressure generating means to the support body and separating the pressure generating means from the support body. These elements may, if appropriate, on the one hand move the support body or preferably a part of the housing of the coating chamber or of the blowing-out chamber in order to establish or separate the desired contact, for example with the support body or the loading platform.

A loading station preferably comprises a storage area, a storage volume or a connection for a feeding conveyor belt in order to keep a supply of support bodies, and if appropriate positioning means, in order to position a not yet processed support body in such a way that the holding device of the positioning device can grip it. Preferably provided in the same way is an unloading station, which comprises a depository (preferably with a conveyor belt such as that which the loading station may also have), in order to remove processed catalyst support bodies from the positioning device. The loading station is preferably configured together with the unloading station, so that one and the same positioning element of the combined loading and unloading station can bring an unprocessed support body from a delivery point to a position, and into a position, so that the loading platform can be loaded with the support body, and the same positioning device of the loading and unloading station takes a processed catalyst support body from the loading platform in order to feed the support body to an unloading location.

In principle, apart from a processing and positioning device, the concept on which the invention is based may be provided by means of a processing and positioning method which performs the function in the form of method steps that have already been discussed above in conjunction with the processing and positioning device. The processing and positioning method according to the invention serves for processing a catalyst support body, at least two processing positions being provided (at the locations at which the processing stations are arranged), the movement of the catalyst support body being performed according to the invention along a circle or within a closed curve within a circular ring. In other words, the support bodies are transported by means of a rotating movement, the axis of rotation of which lies outside the support bodies, as described above on the basis of the arrangement of the loading platform or the support bodies in relation to the turntable. The processing positions are consequently arranged around this axis of rotation and at different angular positions, so that the support body can be transported from one processing position to a next processing position by the rotating movement. Since, as compared with the prior art, only a rotating movement has to be performed, clearly simple implementations are obtained, since arranging the processing positions in a row along a straight line is accompanied by the disadvantages already set out in the description unit. The arranging of the processing positions in a row along a circle or a circular ring makes it possible that the processing position can be changed by simple rotation, without longitudinal movement. Since the catalyst support body is arranged away from the axis of rotation, an eccentric movement is obtained, i.e. a rotating movement with a radius >0, which is used for transporting the support bodies. This simple type of movement makes simple mechanisms possible for positioning the support body, for example a pneumatic connection with respect to the holding device or with respect to the pivoting device, which leads through the turntable.

Apart from the rotational movement, the support body may also carry out a lifting movement, by being displaced parallel to an axis which lies perpendicular to the plane in which the rotating movement is performed. As a result, the support body can be adapted to different heights of the processing positions (the respective height being measured as a distance along the axis of rotation). Furthermore, the support body can be pivoted in order to adapt the position to corresponding processing positions, by the support body being turned about a pivot axis which lies substantially within the plane in which the rotating movement is performed. Alternatively, the pivot axis may be inclined in relation to the plane of the rotating movement, for example by an angular amount of at most 45°, at most 30°, at most 10° or at most 5°. The catalyst support body is preferably releasably held, a loading platform which is connected to the turntable (preferably releasably) gripping the support body by clamping. The releasable holding here comprises: holding, picking up or releasing the support body by the holding device, the picking up being performed by bringing a contact surface up to an object position, the releasing being performed by removing the contact surface from the object position and the holding being performed by pressing the contact surface onto a surface of the support body. The support body is arranged at the object position and comes into contact with the contact surface, although the contact surface is also separated from the support body to release the contact. As described above, a bellows within a recess of the loading platform, which bellows extends along the periphery of the recess, or a group or a multiplicity of bellows, which provides or provide the contact surface or portions of the contact surface, may be used for the fastening, releasing and holding of the support body. The bellows is actuated by a fluid medium being introduced into the bellows or the group of bellows, for example by building up a pressure, or by the pressure in the bellows being reduced by the bellows being emptied. In order to hold the support body, a positive pressure is maintained in the bellows, with which the outer side of the bellows which provides the contact surface presses continuously against the support body. The pressure within the bellows or the amount of medium of the bellows is controlled for example by a pump or a valve, the pressure within the bellows preferably being regulated or monitored. In principle, the bellows may be operated hydraulically, pneumatically by means of an appropriate fluid or electrically by means of an appropriate controlling unit. Instead of inflating or emptying a bellows, a gripper may also be used to provide a contact surface, the gripper moving the contact surface toward the object position or away from it or keeping the contact surface pressed against the support body according to the desired action (closing, opening, holding).

In a preferred embodiment, outer a support element are provided at the stations or at least at the coating station(s). In this embodiment, the holding platform comprises a complementary engaging element, wherein complementary engaging element and the support elements are suited to engage into each other. The complementary engaging element extends from the holding platform in an outward direction and is arranged at the holding platform at a holding platform surface at the side opposite to the turntable. Preferably, the support element comprises a groove extending in the direction of movement of the turntable and the holding platform, i.e. in a tangential direction with regard to the rotary movement of the holding platform. The groove is open towards the turntable and the holding platform and is adapted to at least partly receive the complementary engaging element and is adapted to mechanically support the complementary engaging element as well as the holding platform. In a preferred embodiment, the groove has a variable width. The width substantially corresponds to the thickness of the complementary engaging element at a supporting point and increases towards both ends of the groove. The supporting point can be arranged in the middle between both ends and the course the width can be symmetrical with regard to the supporting point. The supporting point corresponds to the location of the holding device at one of the stations, wherein the holding station is arranged at these locations during operation of this station. The complementary engaging element is preferably in form of a rod, preferably with a circular cross section, the axis of the rod corresponding to the rotation axis of the loading platform when the loading platform is operatively arranged at the station. The diameter of the rod corresponds to the minimum width of the groove, preferably to the minimum width of the groove including a small gap. The groove tapers from its ends towards the supporting point in a continuous way, preferably according to a function with an inclination decreasing towards the supporting point. In this way, the rod can enter the groove without further precision, is supported at a precisely defined height according to a lower surface of the groove at the supporting point and can be rotated/aligned during the movement towards the supporting point. The support element is fixedly arranged with regard to the processing and positioning device and does not follow the movement of the turntable. Further, the support element is arranged not to follow any movements or in particular rotations of the holding platform.

According to an advantageous embodiment, the support element is connected to an adjustable stand which extends parallel to the rotation axes of the turntable. The support element connected to the adjustable stand can be adjustably positioned along a line parallel to the rotation axes of the turntable. According to a first alternative, the length of the stand is adjustable and the support element is connected to the stand. According to a second alternative, the support element can be connected to the stand at an adjustable height. Preferably, the support element is positioned such that the holding platform holds the catalyst support body in a horizontal position, the longitudinal axes of the catalyst support body being in parallel to the direction of force of gravity. Since the coating station provides the slurry as a liquid with a horizontal surface, this enables an exact orientation of the catalyst support body with regard to the slurry.

The processing and positioning device preferably comprises a support element for each station. In particular, the processing and positioning device comprises an individual supporting element for each coating station of the device, each of the individual supporting elements being arranged at the pertaining coating station. Preferably, the support elements are not in direct connection with each other and the groove extends over an angle of 0.5°-30°, 1°-20°, 2°-10° or, most preferably, 2°-5°, the angle being related to the rotary movement of the turntable.

In another embodiment, the support element extends over more than one stations, wherein the groove extends over a fraction of the circumference of the inventive device, the fraction being ⅛, ⅙, ⅕, ¼, ⅓, ½, ⅔ or ¾. Further, the support element can encompass the table completely for a complete circumference. In this embodiment, the groove forms a railing.

In general, the width of the groove at the supporting points corresponds to the thickness of the complementary engaging element for providing a firm fit. Between the supporting points, the width of the groove is larger than the width at the supporting points enabling a rotation of the holding device according to a rotation axes perpendicular to the rotation axes of the turntable.

Apart from the positioning, it is also provided according to the invention to process the support body in the way described above. The processing steps comprise: weighing, coating by introducing catalyst material into a catalyst support body which is introduced into a coating chamber (whereupon the latter is closed), blowing out in order to remove excess catalyst material from the support body, both coating and blowing-out comprising the generation of a pressure which is exerted either on a gas or a flowable catalyst material, and feeding or loading catalyst support bodies in a loading and unloading station. Preferably, the support body is brought into a horizontal position (directly) after the coating and after the blowing-out, by the pivoting device being actuated. The pivoting movement preferably begins already before the coating station is left. For example, for this purpose part of the coating station that serves for forming the coating chamber, for example a hood, is pivoted at the same time.

Finally, the concept on which the invention is based is realized by the use of a rotary indexing table in order to transport catalyst support bodies from one processing position to a further processing position with a loading platform fastened to it, as already described above. A loading platform which can grip the catalyst support bodies is preferably used here, a bellows being used to exert the force of a pressure on the support body and consequently hold the support body in place. The bellows is also used, by means of inflating and emptying, to arrest the support body on the holding device or release it from the latter. The use of an inflatable bellows as a holding device for catalyst support bodies to be processed and to be transported offers clear advantages with respect to reliability, costs and maintenance as compared for example with holder halves produced from silicone that are moved toward one another for fastening the support body. In particular, a completely encompassing bellows automatically provides an equalization of the pressing pressure, and consequently a completely homogeneous distribution of the pressure that acts on the support body.

BRIEF DESCRIPTION OF THE DRAWINGS

FIG. 1 is a representation of an overview of the processing and positioning device according to the invention. A turntable 10 is provided by a rotary indexing table 12, both of which are represented in FIG. 1 in plan view. The area centroid of the substantially circular turntable corresponds to the axis of rotation D, with which the turntable is turned, driven by the rotary indexing table 12. Extending out from the turntable in a radial direction are connecting webs, which are arranged at the same angular distance from one another. One of the connections, which is assigned to a loading platform positioned at the station b, connects the turntable (or the rim of the turntable) to a holding plate 18, which runs perpendicularly to the plane of the image. A pivoting device 14 is fastened to the holding plate 18, so that one part of the pivoting device 14 is rigidly connected to the turntable by way of the holding plate 18 and the connection 16, and another part of the pivoting device 14 is connected to the loading platform, so that, when the turning element is actuated, the loading platform turns about the axis of rotation of the pivoting device. As already noted, the axis of rotation of the pivoting device is perpendicular to the axis of rotation of the turntable and intersects the latter preferably at the height at which the loading platform extends, i.e. in the plane of the drawing of FIG. 1.

Figure 1:
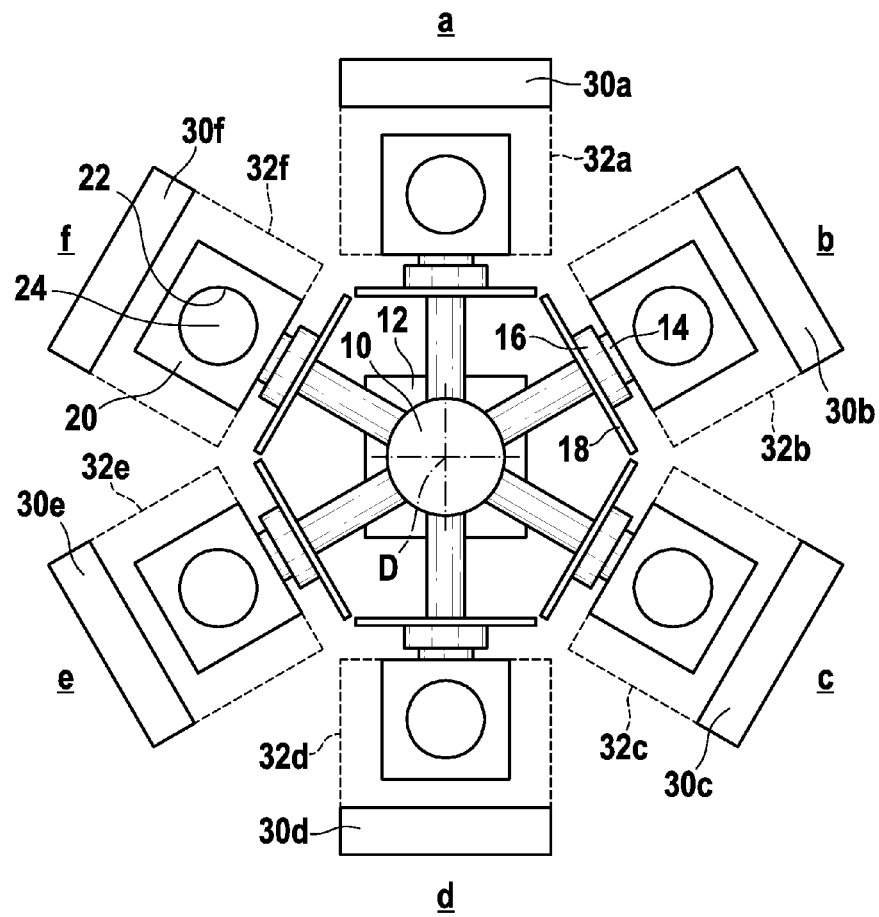
FIG. 1 is an embodiment of the processing and positioning device according to the invention in the representation of an overview.

Generally, processing positions at which loading platforms are successively arranged are arranged around the turntable at the same angular distance from one another at positions a, b, c, d, e, f. Represented by way of example at the processing position f is a loading platform 20 arranged there, which has a holding device 22, with which catalyst support bodies that are located within the holding device 22, i.e. at a holding location 24, can be arrested by means of the holding device 22. The opening provided for the catalyst support body is represented in FIG. 1 in the form of a circle, but may have any desired form that is adapted to the cross section of the catalyst support body or a portion thereof. The holding device 22 is preferably a recess provided in the holding device 20, the continuously formed inner periphery of which offers a supporting surface for a bellows. The bellows preferably extends (in the emptied state) along the inner periphery of the recess, so that the bellows expands toward the middle of the recess when it is filled.

The processing stations 30a-30f represented diagrammatically in FIG. 1 respectively provide a processing position 32a-32f, which are arranged fixedly with respect to the rotary indexing table and the turntable. Preferably, the processing positions 32a-32f are not respectively arranged along an angular portion but have a specific angular alignment, to which the positioning device according to the invention positions the support body (with a certain accuracy). The dashed position 32a-f represented in FIG. 1 corresponds to the extent of the processing location of the respective processing station 30a-f, so the loading platform with the catalyst support body is preferably positioned to a predetermined point or to a predetermined angle within this area and outlined by a dashed line, i.e. for example the middle or angular center of the area represented by the dashed line. The positioning device is preferably arranged in this way, to keep the loading platform continuously at certain angles only, whereas the angular distances lying between these positioning angles are passed over by the positioning device without stopping. The angular settings discretely provided in this way correspond to the customary indexed manner of rotation of a rotary indexing table.

The positions represented in FIG. 1 are respectively arranged in pairs, so that three different processing stations that are respectively arranged in pairs opposite one another are respectively provided. These are preferably combined with individual stations, so that for example, in the configuration represented in FIG. 1, the station d serves for the loading and unloading of the catalyst support bodies, and as a weighing station. The opposing station a is a weighing station, the stations a and d being arranged as a pair in relation to one another with regard to the function as a weigher, but the overall arrangement represented in FIG. 1 only comprising a single station, which is provided for loading and unloading, i.e. station d. The stations b and e are, for example, coating stations and the stations c and f are blowing-out stations, which remove the excess catalyst material that has been introduced into the support body from the coating stations e and b. The processing stations may be divided into groups, so that for example the stations d, e and f represent group 1, and the processing stations a, b and c represent a second group. However, both groups rely on the loading and unloading function of the station d (which consequently is assigned to both groups for this function). The turning direction of the turntable may always be the same direction or be periodically reversed after a certain number of steps, after half a revolution or a complete revolution or after an integral part of a revolution.

Figure 2:
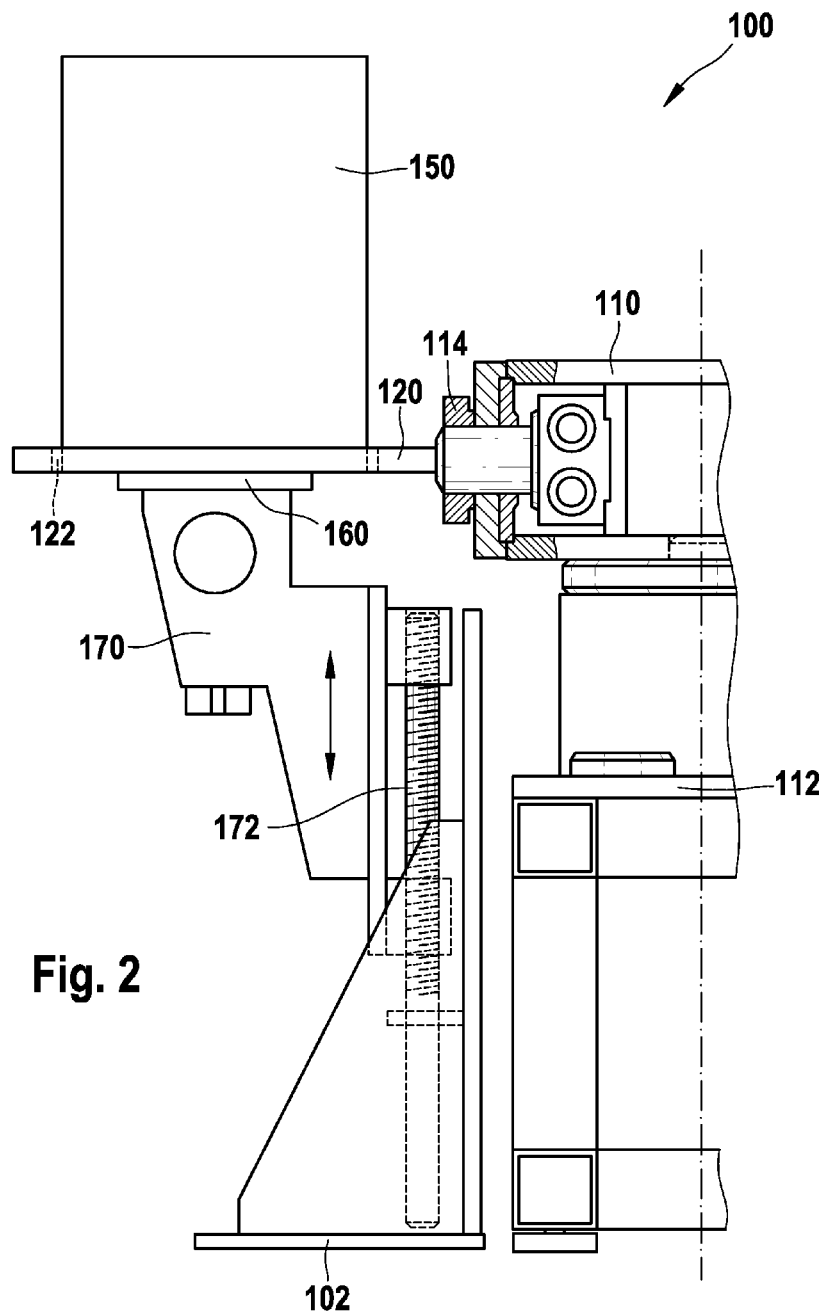
FIG. 2 shows a cross section of a processing and positioning device according to the invention on the basis of a weighing station.

FIG. 2 shows the configuration of the processing and positioning device according to the invention on the basis of a weighing station. The weighing station 100 is provided in the range of a rotary indexing table 112, which comprises a turntable 110. Fastened on the turntable is a pivoting drive 114, to which in turn a holding platform 120 is fastened. The loading platform 120 comprises a holding device 122 in the form of a recess which extends through the loading platform and on the underside of which a bellows is arranged. Provided within the recess (and within the bellows) is a space for a catalyst support body 150, which is fixedly connected to the loading platform 120 by the pressure of the filled bellows 122.

The weighing station 100 comprises a force sensor 160, which can be moved up to an underside of the catalyst support body 150 by way of a lifting device 170, which comprises a spindle drive 172. In this case, the holding device 122 releases the connection between the catalyst support body 150 and the unloading platform 120, so that the entire force of the weight is transmitted to the two-dimensional force sensor 160. In the case represented in FIG. 2, the force of the weight of the catalyst support body is measured by placing it onto a force sensor surface. In principle, however, releasable gripping devices or plug-in connections between the force sensor and the catalyst support body are also conceivable. The longitudinal axis of the cylindrical catalyst support body 150 runs along the axis of rotation of the turntable, it being possible for the pivoting device 114 to adapt the position of the catalyst support body to different processing positions. The weighing station is fixedly connected to the underlying base by way of a standing foot 102.

Figure 3A:
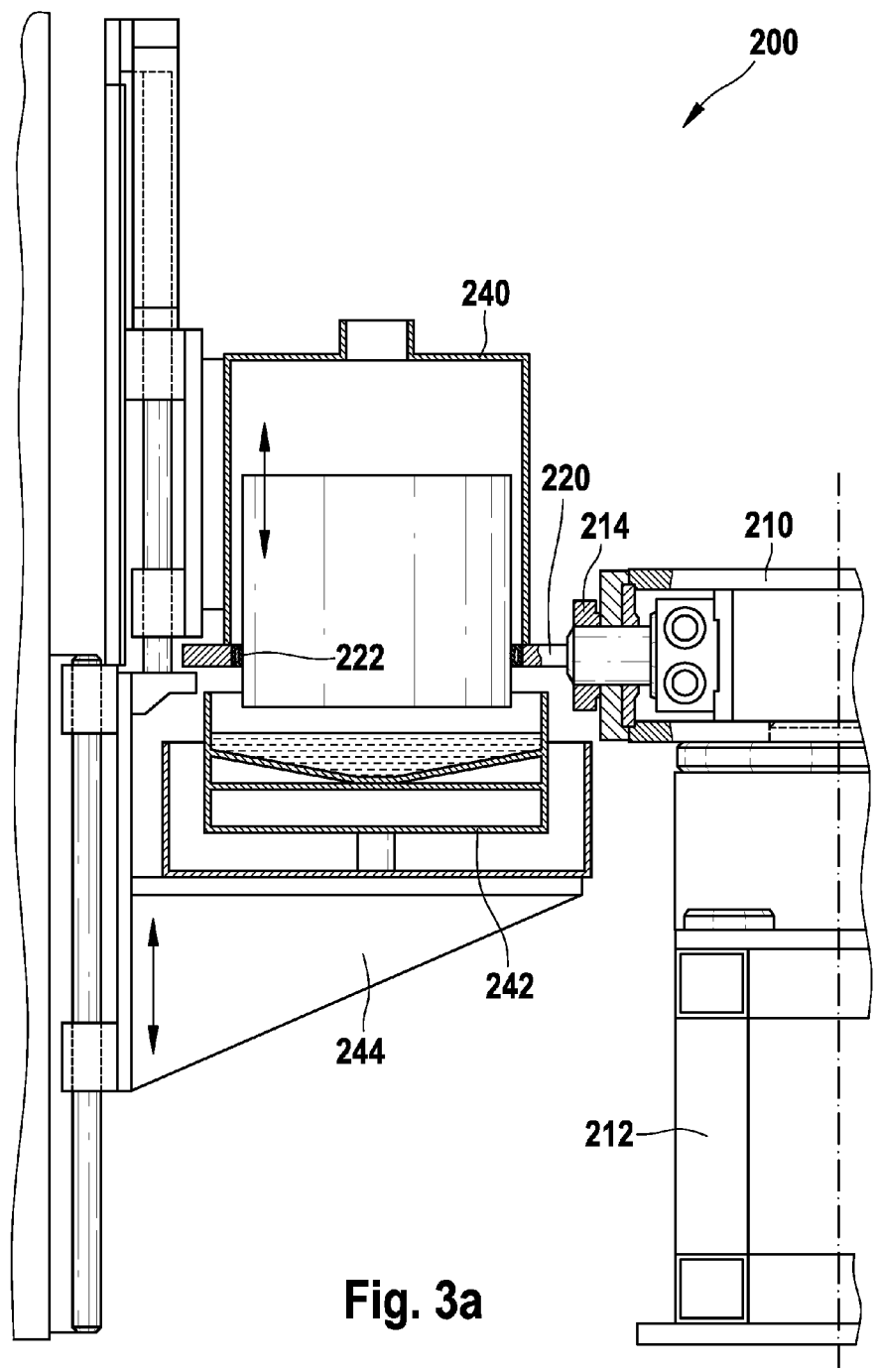
FIG. 3a shows a cross section of a further processing and positioning device according to the invention on the basis of a processing or coating station in cross section.

In FIG. 3a, a device according to the invention is represented, with a coating station represented in detail. The device represented in FIG. 3a comprises a positioning device 200, which comprises a turntable 210, which is driven by a rotary indexing table 212. As also in FIG. 2, in FIG. 3a a pivoting device 214 is connected to the turntable 210, which in turn is connected to a loading platform 220. The fastening of the loading platform 220 to the pivoting device 214 (or a shaft which is driven by a pair of opposing pneumatic or hydraulic cylinders by way of a gear mechanism) is provided by way of a releasable and lockable plug-in connection. The holding device 222 arrests the catalyst body and releases it again after the processing.

The coating station comprises a two-part, partly closable housing with a vacuum hood 240 and a corresponding immersion pan 242. The immersion pan comprises an outer surround and an inner immersion pan, in which the catalyst material is provided. The support body protrudes on the underside of the loading platform downward beyond the latter, so that one end of the support body comes into contact with the catalyst material when the immersion pan is moved upward. The surround serves for collecting catalyst material that escapes from the immersion pan or as a result of splashes during the coating and serves furthermore for holding the immersion pan by means of a connection which connects the surround to the bottom of the immersion pan in a mechanically stable manner. Furthermore, catalyst material is introduced into the immersion pan by way of the connection. By placing or pressing it onto an upper side of the loading platform, the vacuum hood can be connected fluid-tightly to the upper side of the loading platform, so that they together form a closed chamber. For this purpose, the portion in which the vacuum hood comes to lie is sealed off with the holding device, which in turn grips around the catalyst on its outer surface, preferably completely, and consequently seals off the loading platform with the outer surface of the catalyst body. The vacuum hood comprises an access at the top of the vacuum hood, in order to be able to place there a negative pressure source (not represented), which is in fluid connection with the chamber when it is connected to the vacuum hood. In order to open the chamber, whereby the catalyst support body can be introduced into the chamber, and close the chamber again, for example in order to perform the negative-pressure coating process (by means of absorption at one end of the catalyst body while the opposite end of the catalyst body is immersed in the catalyst material), the vacuum hood 240 (and also the immersion pan) can be displaced in a direction along the axis of rotation of the turntable, as represented by the upper, vertical arrow at reference sign 222 or 240. Consequently, the immersion pan, which provides a trough for catalyst material, is also provided on a lifting platform, which can be raised and lowered, as represented by the associated arrow. The platform 244, on which the immersion pan is fastened, is displaceably fastened to a column which serves as a sliding bearing and is displaceable parallel to the axis of rotation of the turntable, as indicated by the arrow at reference sign 244.

The immersion pan is brought up to the loading platform, and consequently up to a lower end of the support body, but is not sealed off from the loading platform. In a way similar to the immersion pan, the vacuum hood is guided along a column offset therefrom, which makes it possible that the vacuum hood can be lifted and lowered, i.e. can be displaced in a direction (cf. vertical arrow at reference sign 244) which is parallel to the direction of the axis of rotation of the turntable. In a preferred embodiment of the invention, the vacuum hood and the insertion pan are releasably fastened to the loading platform, and can be turned together with the loading platform by, for example, 90° or 180°. In this case, the lifting devices of the platform, of the insertion pan and of the vacuum hood are not connected to them but are temporarily released from their mountings, in order to follow the pivoting movements of the loading platform.

In the closed state, during which the vacuum hood is subjected to negative pressure, the vacuum hood is lowered completely onto the loading platform and sealed off with it, while the immersion pan is in its upper position, in which the lower end of the support body, i.e. the lower end face of the cylindrical support body, is preferably positioned completely under the surface of the catalyst material. Preferably, negative pressure is only built up in the vacuum hood when the lower end face of the cylindrical support body is completely immersed in the catalyst material. After the absorption of the catalyst material, the vacuum hood moves again into the upper position and the insertion pan moves into the lower position, i.e. the vacuum hood and the immersion pan move apart. The moving apart is preferably accompanied by a pivoting operation of the loading platform and of the vacuum hood, the vacuum hood still resting on the loading platform while pivoting takes place, at least at the beginning. For the time during which the vacuum hood is closed off with the loading platform, the negative pressure in the vacuum hood is preferably still maintained in such a way that substantially no catalyst material, or only a slight amount of catalyst material, flows out from the lower end, which is then no longer immersed. Both the pressure and the speed of movement and timing of the pivoting movement and the up-down movement of the vacuum hood and of the immersion pan can be adapted to the viscosity and the desired amount of coating that remains in the catalyst body.

The projecting rim of the immersion pan 242 or the filling level of the catalyst material located in it are preferably set up in such a way that the lower end face of the support body is completely immersed, while a gap remains between the rim of the immersion pan and the underside of the loading platform to equalize the pressure. The gap is preferably at least 1 mm. Alternatively or in combination with this, the immersion pan may have an outer wall which has in the upper portion, above the catalyst material, an opening to allow the pressure equalization, so that air can flow in and an absorption flow into the catalyst body is made possible. Furthermore, the loading platform may hold the catalyst body in such a way that the lower end face protrudes adequately from the loading platform.

Furthermore, the lifting device of the pivoting cylinder may be combined with the lifting device of the platform for the immersion pan, so that only one actuator or one mechanism is necessary for raising and lowering the vacuum hood and the immersion pan.

Figure 3B:
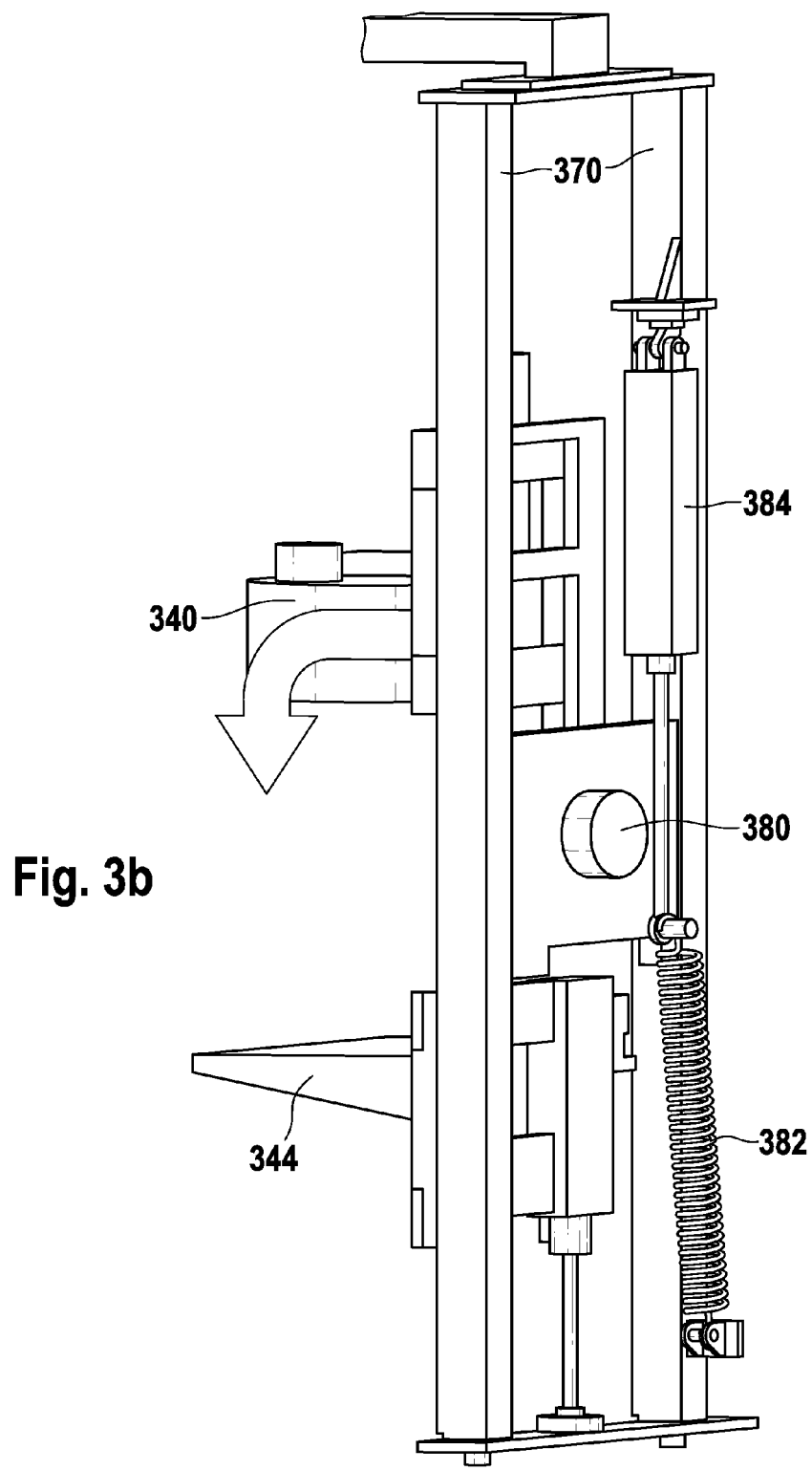
FIG. 3b shows an embodiment of the processing station represented in 3a, with a lifting mechanism represented in detail.

Represented in FIG. 3b is a configuration of the coating station reproduced in 3a, in which the vacuum hood and the immersion pan can be moved toward the loading platform and can be pivoted together with the loading platform. The vacuum hood is preferably pivotable together with the loading platform, the immersion pan being lowered, or already in the lowered state, during the pivoting movement. Represented in FIG. 3b is a frame 370, in which the vacuum hood 340 and the platform 344 that is provided for the immersion pan are mounted. The mounting of the vacuum hood on the frame makes lowering possible, as indicated by the arrow represented in FIG. 3b, in order to close the chamber. For reasons of simplicity, FIG. 3b does not show the immersion pan itself, but only the platform on which the immersion pan is fastened. The pivoting arm 380, which belongs to the holder of the vacuum hood and the platform, is fastened to the frame 370 together with a spring 382 and a pivoting cylinder 384. The pivoting arm can be turned and is drawn on the one hand in a first direction by the spring 382, the pivoting cylinder 84 extending in the opposite direction and similarly being connected to the frame 370. The axis of rotation of the vacuum hood (and also of the loading platform) preferably corresponds to the pivot axis of the pivoting device.

In principle, a platform, like the platform represented in FIG. 3b by the reference sign 344 or a platform 160, as represented in FIG. 2 as part of a weighing station, can be displaced in the vertical direction (i.e. along the axis of rotation of the turntable) by way of a spindle drive or by way of other actuators. In principle, pneumatic or hydraulic lifting devices are conceivable, it being possible for the spindle drive to be operated electrically with an electric motor, or else pneumatically or hydraulically. The frame 370 can be arranged at each angular position that corresponds to a processing position and can be used for fastening the processing stations.

Figure 4:
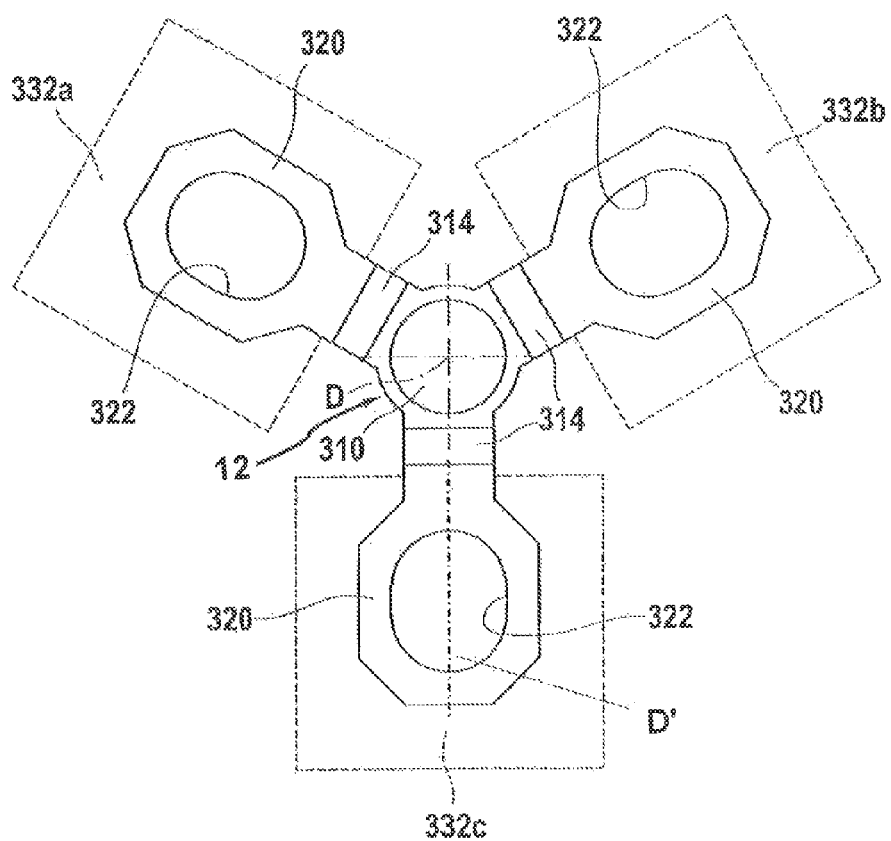
FIG. 4 shows a representation of an overview of a further processing and positioning device.

In the same way as FIG. 1, FIG. 4 shows a representation of an overview of a configuration of the invention. A turntable 310 can be turned about an axis of rotation D, which extends perpendicularly to the plane of the drawing. The turntable is connected by way of a pivoting drive 314 to a holding device 320, which comprises the loading platform 322. Represented in FIG. 4 is a turntable to which three of these holding devices 320 are fastened by way of respective pivoting devices 314. The loading platforms 320 (and also the pivoting devices 314) are arranged at an angle of 120° in relation to one another in a plane that is perpendicular to the axis of rotation D. The respective stations are merely represented as areas 332a, b, c and merely reproduce the location at which the respective processing positions are arranged, for example fastened to a frame that surrounds the rotary indexing table and to which all the processing stations are modularly fastened. Depending on the function, the processing stations may have different base areas, which has not been taken into consideration in FIG. 4. Rather, the device represented in FIG. 4 is intended to stop at precisely three different angular positions (i.e. 0°, 120°, 240°), and position the catalyst support bodies there. The angular regions lying in between are preferably passed over by means of a continuous rotating movement, during which the pivoting device can turn the support bodies.

In the configuration represented in FIG. 4, the station which is assigned to the area 332c is a loading and unloading station, which moreover also has a weight sensor for weighing. The station which is assigned to the position 332c is consequently a combined weighing and loading and unloading station. The next-following station 322a serves for vacuum coating, in which the catalyst support body is subjected to a pressure gradient, preferably a negative pressure, which at the same time is combined with a normal pressure at another location of the support body (at the end that is immersed in the trough), an immersion pan with liquid catalyst material being provided at the location of the normal pressure. As a result, the catalyst material is absorbed into the support body and gets into the pores of the catalyst. The stations 332a-c or their location are represented by dashed lines, so that merely a possible outline of the part of the processing stations that is relevant to the support body is represented in FIG. 4.

Excess catalyst material is forced out of the catalyst support body by air pressure in the next-following blowing-out station 332b. For this purpose, a blowing-out hood, in which there is generated a positive gas pressure that produces a flow from one end of the support body to the opposite end, is lowered onto the loading platform.

In principle, a drying processing station, in which a gas flow, which may be heated, is brought up to the support body and passed through it in order to remove evaporating components of the catalyst material (for example water of a slurry of catalyst support particles), may be provided.

Further embodiments (not represented) comprise a connection between the holding platform and the pivoting drive, which is provided releasably by way of a latchable plug-in connection. The pivoting drive is preferably set up furthermore for also performing a pivoting movement during the turning of the turntable, the pivoting movement and the rotating movement being driven by the same actuator, i.e. by an actuator of the rotary indexing table, by means of a suitable, preferably mechanical coupling. For example, the rotary indexing table and the pivoting drive may be driven by the same pneumatic compressed air source.

A recess for the support body is provided within the holding platform, a completely encompassing groove, in which a rubber or silicon bellows is located, being provided in the inner periphery of the recess, the bellows preferably similarly running all the way along the inner periphery. As a result, the bellows can be held at least partially within the groove.

Furthermore, a lifting mechanism may be provided in the form of a servodrive, which determines the height of the loading platform, the height relating to a distance along the axis of rotation of the turntable. Such a lifting mechanism may preferably be provided in the form of a servodrive in a loading and unloading station, in order to make allowance for different lengths of cylindrical support bodies. The servodrive may comprise an electrically driven vertical spindle.

Furthermore, a coating station, for example a vacuum coating station, may comprise a two-part housing, as described above, part of the housing, for example a vacuum hood, being pressed onto an upper surface of the loading platform, and a lower housing part, for example the immersion pan, being brought up to a lower surface of the loading platform (but not closed off with it). If the loading platform extends in the form of a plate, the closed-off chamber is formed by the loading platform and the vacuum hood, the portion of the catalyst support body that protrudes on the other side of the loading platform being subjected to the ambient air pressure and receiving catalyst material as a result of the immersion in the immersion pan.

In the same way, a blowing-out station, which removes excess catalyst material, may also be provided, a blowing-out chamber being formed by a blowing-out hood, which is lowered onto the loading platform in which the support body is located, the blowing-out hood being sealed off with the loading platform. On the side of the loading platform opposite from the blowing-out hood there is preferably a collector for the coating medium, which receives excess catalyst material when a positive pressure is built up in the blowing-out hood and the catalyst material is discharged into the surroundings, i.e. into the collector, through the support body as a result of the pressure gradient. Preferably, both the blowing-out hood and the collector (for example a collecting tube) can be lifted and lowered, preferably by means of two servodrives. In order to improve the lifting and lowering operation of the collecting tube and the blowing-out hood, they are preferably fastened in a sliding manner to a rod running parallel to the axis of rotation of the turntable, so that the rod serves as a guide. Aluminum guides with plastic bearings are preferably fastened to the guide, which makes cleaning with water easier. For sealing off with the blowing out hood (or else with a vacuum hood), the loading platform preferably comprises on one side (for example on the upper top side) an elastic sealing support, for example in the form of a silicone film. Furthermore, the blowing-out hood or the vacuum hood is equipped with a sealing ring at the location which forms the abutting edge with the loading platform when the hood is lowered onto the loading platform. The loading platform grips around the support body completely and is formed continuously, at least up to the encompassing pressing-on edge of the vacuum or blowing-out hood, so that the hood, the top side of the loading platform, the bellows and the encompassing contact surface or edge of the outer side of the support body separate the inner space of the hood completely from the surroundings when the hood is resting on the loading platform.

In order to support the coating and blowing out by the flow that is obtained by the force of the weight of the catalyst material, the axis of rotation D of the turntable is provided perpendicularly to the underlying base, i.e. along the direction in which gravity acts, so that the rotary indexing table is located perpendicularly on a planar, horizontal underlying base.

Figure 5:
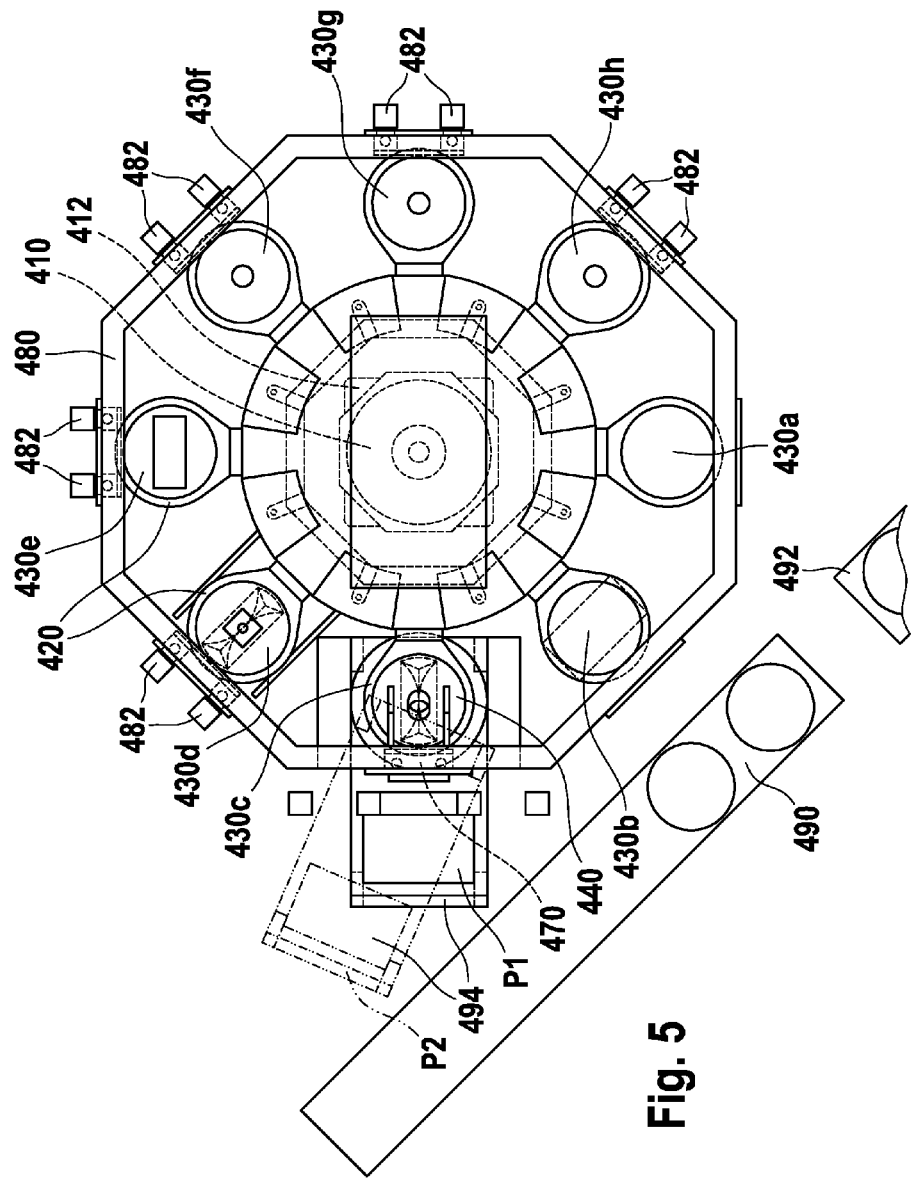
FIG. 5 shows a representation of an overview of a further configuration of the device according to the invention with eight positions.

FIG. 5 shows a further configuration of the processing and positioning device with a total of 8 processing positions. The turntable 410, which is driven by the rotary indexing table 412, represents the single central positioning device, which allows transporting of the support bodies along a circular ring or a circular path. As already described, individual processing positions are arranged along the circular path. The processing positions, described in more detail below, are provided by processing stations, which are arranged around the rotary indexing table with the same distance from the axis of rotation of the latter. Represented in FIG. 5 is a frame 480, which is formed as a polygon, the number of sides of the polygon corresponding to the number of processing stations. The processing stations are respectively arranged at the middle of each side, the polygon being equilateral and equiangular. The frame 480 is consequently formed in one plane, which extends according to the plane of the turntable (i.e. parallel thereto or extending along it). Provided perpendicularly to the encompassing frame 480 are further frame elements, which are formed parallel to the axis of rotation of the turntable. The frame elements 482, which consequently run vertically, are fixedly connected to the encompassing frame 480 and form a fastening possibility for the individual processing stations. The vertically running frame elements 482 are arranged centrally on the respective sides of the polygon and define the angular position of the associated processing position. Of the processing stations that are fastened to the frame 480/482, merely the base areas of the corresponding units are represented. The base areas mark the position of the associated processing position.

In FIG. 5, a device according to the invention with 8 processing stations 430*a-h* is represented. The processing stations are arranged around the turntable 410 of the rotary indexing table 412 substantially with the same distance from the axis of rotation of the rotary indexing table and with the same angular distance from one another. Represented on the turntable 410 in the accustomed way are loading platforms 420, which are respectively connected to the turntable by way of the pivoting device. The number of loading platforms corresponds to the number of processing positions, the loading platforms being arranged like the processing positions at the same distance from the axis of rotation of the turntable and having the same angular distance from one another. The respective pivoting drives are preferably pneumatically driven, this offering the possibility of leading the pneumatic supply line in the form of channels through holders and the turntable, in order to connect an external compressed source by way of corresponding valves.

The processing stations 430*a-h* are formed as follows, in this sequence: as loading and unloading stations, as a weighing station, as a coating station, as a blowing-out station, as a second weighing station, and as three successive drying stations 430*f-h*. The weighing station 430*b* senses the weight of an uncoated delivered support body, whereas the weighing station 430*b* senses the weight after the coating and blowing-out operation. In particular for transporting operations after the coating station, the pivoting drive is activated in such a way that the support body is kept horizontal, if possible. This requires pivoting, for example before and after the blowing-out station, since this requires processing of the support body in a vertical position. If appropriate, all the transporting operations between individual stations that are visited after the coating station may be provided by a combined pivoting and rotating movement, the pivoting movement serving the purpose of providing the position of the support body from the vertical position into the horizontal position, and vice versa, and the rotating movement serving the purpose of transporting the support body along a circle or a circular ring from one station to the next.

Apart from the individual processing stations 430*a-h* arranged in the form of a circle, a delivery conveyor belt 490 and an offloading conveyor belt 492 are provided, the conveyor belt 490 providing support bodies that are transported to the station 430*a*, and the conveyor belt 492 receiving support bodies that come from the station 430*a*. For transporting support bodies between conveyor path 490, station 430*a* and conveyor path 492, a transfer means is preferably used, for example in the form of an industrial robot with a gripper.

The coating station 430*c* also comprises a catalyst material carriage 494, which comprises a peristaltic pump and a mobile immersion pan. During the coating operation, the catalyst material carriage 494 is in the position P1, i.e. the immersion pan is at the processing position in which it can come into contact with the support body. In the position P2, the catalyst material carriage has been offset outward and turned slightly about an axis which is parallel to the axis of rotation of the turntable, in order to make a modification to the immersion pan or maintenance work on the immersion pan possible. Furthermore, in this way the immersion pan and the catalyst material located in it can be exchanged. The coating station 430*c* also comprises a pivotable vacuum hood 440, which can on the one hand be lowered onto the loading platform in order to close off with it in a sealed manner, and build up a pressure in the chamber provided as a result, and which can also be pivoted together with the loading platform, a pivoting arm 470 making possible a rotational movement for the vacuum hood (and if appropriate also the immersion pan or elements of the immersion pan that are not filled with catalyst material), which corresponds to the rotational movement of the likewise pivotable loading platform. Therefore, during the pivoting of the loading platform and the vacuum hood, these two components can remain in direct contact with one another without the chamber formed as a result necessarily being opened. The common pivoting operation may also be accompanied by slow opening, in which the vacuum hood is released from the loading platform. The connection between the vacuum hood and the loading platform is preferably only released when the common pivoting movement is already partly completed, for example an angle of at least 10°, 20°, 30°, 45° or 60° has already been passed through. Furthermore, the pivoting movement of the support body is begun as soon as possible after the filling with the catalyst material, in order to avoid the forming of and inhomogeneous material distribution due to the influence of gravity, in particular in the case of a catalyst material with low viscosity. In an embodiment not represented, a coating station is followed by a second coating station, the support body being turned by 180° between these two coating stations and consequently filled with catalyst material from the other end in the second coating station than in the first coating station.

Figure 6:
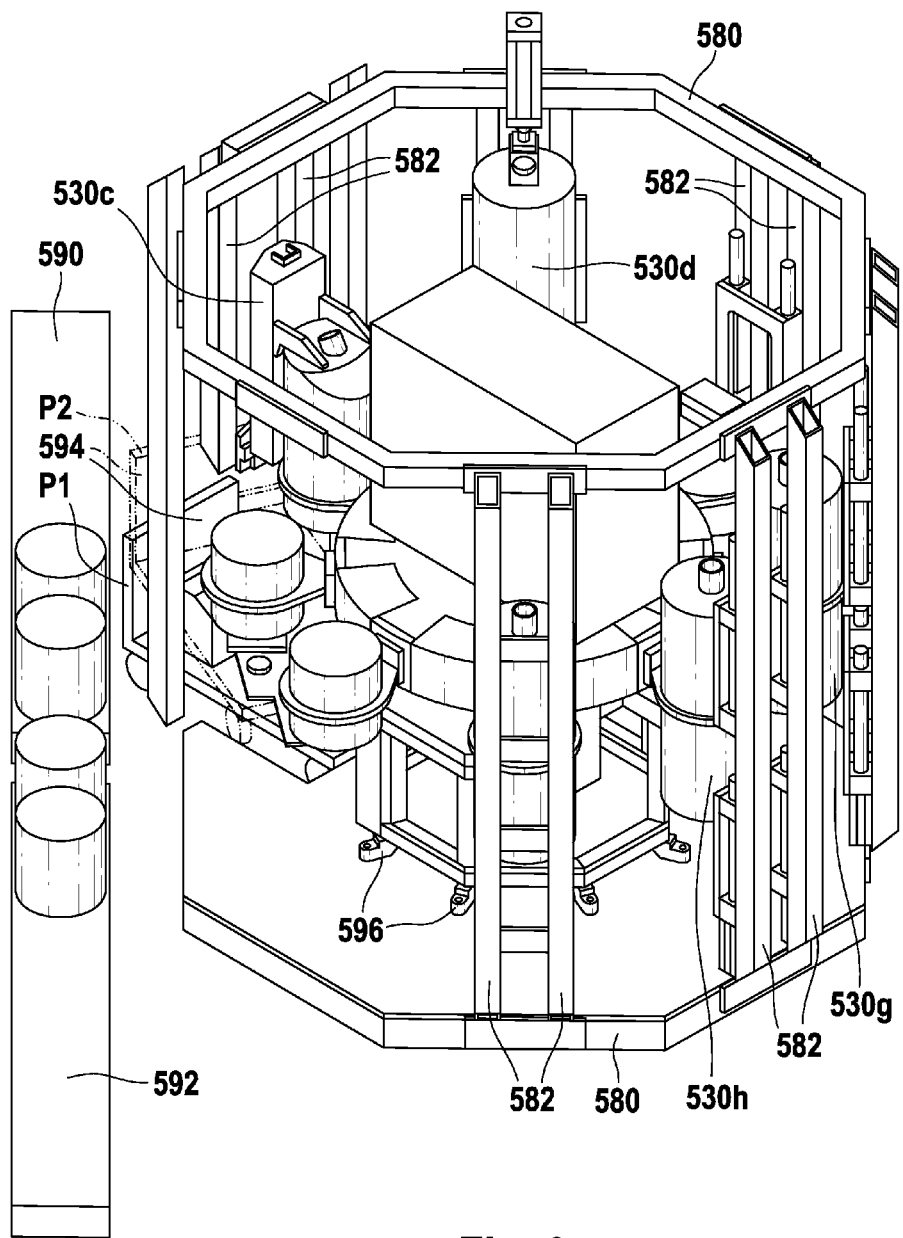
FIG. 6 shows a perspective representation of the device represented in FIG. 5.

FIG. 6 shows a perspective representation of the device from FIG. 5, in which the encompassing frame 580 (corresponding to frame 480) with the vertically running frame elements 582 (corresponding to 482) can be seen well. In FIG. 6, only some of the processing stations are represented to provide a better overview. The processing station 530*c* (corresponding to 430*c*) comprises a vertically displaceable carriage, to which the vacuum hood is fastened. The vacuum hood is fastened to the carriage by way of a clamping device. The carriage itself comprises a pivoting device, with which the vacuum hood can be pivoted (preferably together with the loading station). Since the pivoting axis is determined by the loading platform, the pivoting movement provided by the carriage 594 is eccentric (i.e. offset radially with respect to the center of mass or an axis of symmetry of the carriage or of the hood). The axis of rotation lies outside the center of the vacuum hood. The axes of rotation of the hood, of the carriage and of the support body preferably correspond to the axis of rotation of the pivoting device, so that they can perform the same rotating movement. The pivoting axis lies approximately at one end of the vacuum hood, since the loading platform, and in particular its pivoting axis, are provided there. The station 530*d* is a blowing-out station with a liftable and lowerable blowing-out hood, as already described. The stations 530*g* and *h* comprise two housing halves that are movable toward the loading platform and comprise a lead-through, through which preferably hot air can be blown. The flow produced in this way has the effect that the catalyst material provided in the support body is dried. Furthermore, in FIG. 6, the catalyst material carriage 594 (corresponding to 494) is represented in two different positions, the carriage being represented only incompletely for the position P2 to provide a better overview. During operation, the carriage is in the position P1, i.e. in a position in which the loading device can place the catalyst support body where the body must be provided for correct processing, i.e. at the station. It can also be seen that the rotary indexing table itself is fixedly connected to the underlying base by way of four fastening elements 596. It can also be seen that the rotary indexing table comprises a framework above which the turntable is arranged, the drive being provided under the turntable and within the framework. Finally, a running belt 590, which serves for loading catalyst bodies, is also represented in a symbolic way, a further running belt 592 serving for unloading the catalyst bodies.

In FIG. 6, also arranged in the center of the processing stations is the rotary indexing table and a framework on which the rotary indexing table is arranged. Arranged circumferentially are the holding devices, which extend radially outward and are connected to the rotary indexing table by way of pivoting devices. All the holding devices have the same distance from the middle, i.e. from the axis of rotation of the rotary indexing table. Furthermore, all the holding devices neighboring one another are away from one another by the same angle, and consequently with the same distance. The holding devices are evenly distributed around the circumference of the rotary indexing table.

Figure 7:
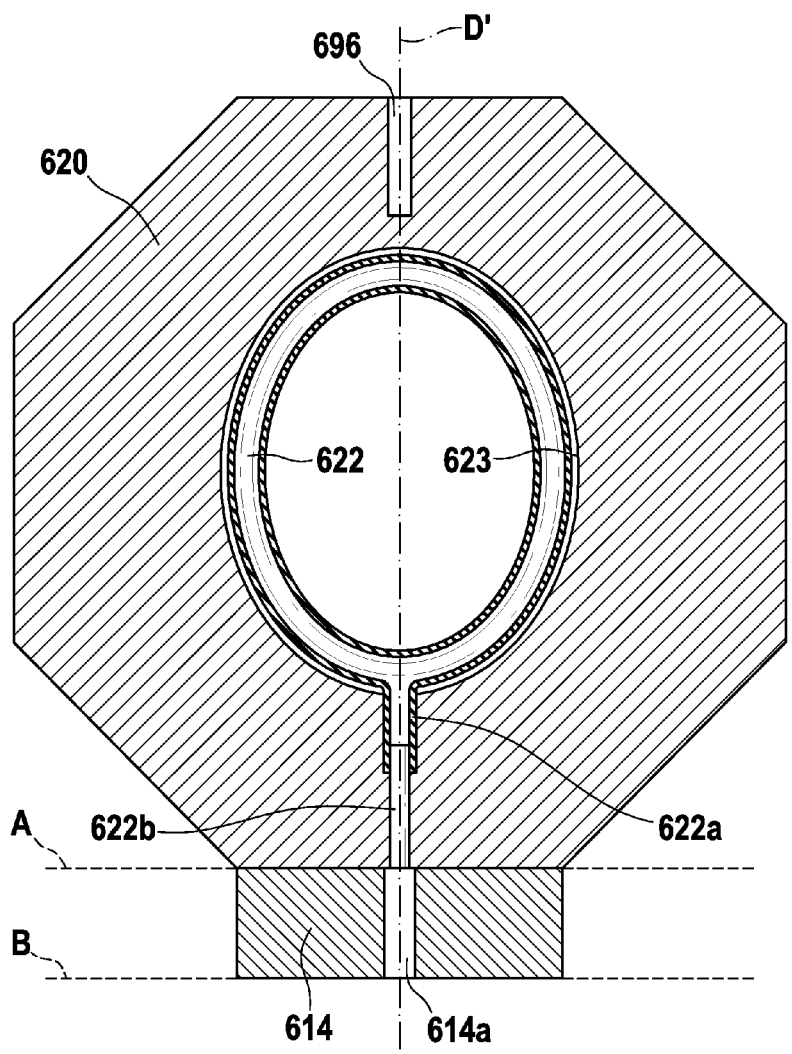
FIG. 7 shows a detailed representation of a loading platform of the device according to the invention.

FIG. 7 shows a preferred embodiment of a holding device 620 that is used in the invention. This comprises a central oval recess, in which the bellows 622 is provided. The bellows is provided as a closed envelope with a feed 622a, and runs along the inner periphery 623 of the recess. The loading platform itself also comprises a feed 622b, configured as a channel and preferably in the form of a pin which engages in the feed 622a and closes off with it in a fluid-tight manner. The fluid-tight connection to the interior of the bellows 622 that is provided by the feed 622b is continued through a channel 614a, which is provided within the pivoting device 614, which directly abuts the loading platform 620 in the plane A. In FIG. 7, only the part of the pivoting device 614 that is fixedly connected to the loading platform is represented, a further part, rotatable thereto, abutting the pivoting device by way of the contact surface B. The part of the turning device that is pivotable with respect to the loading platform 620, in the same way as the part represented too, comprises a channel, which adjoins the channel 614a. The channels within the various parts of the pivoting device are preferably fluid-tightly connected to one another, for example by way of pneumatic rotary connections, which allow a rotating movement in spite of simultaneous sealing. The turning carried out by the loading platform 620 corresponds to a turning about the axis of rotation D', which preferably runs substantially perpendicularly to the axis of rotation of the turntable D. The axis of rotation or pivoting axis of the pivoting device D' runs along an axis of symmetry of the loading platform, and in particular preferably along the channels 614a, 622b, 622a and along a channel of the pivoting device that adjoins the channel 614a. The fluid connection leading to the interior of the bellows is preferably continued within the rotary indexing table, in particular to a channel portion that runs along the axis of rotation of the turntable D, so that pneumatic rotary connections that are fluid-tight and nevertheless allow turning can similarly be provided there. An outlet of the rotary indexing table makes a connection of an internal pressure source possible, the outlet being connected to the interior of the bellows 622 by way of the channels described above. According to a further configuration, in which the rotary indexing table comprises a number of holding devices, the channel routing within the turntable is different for each loading platform, so that the latter can be individually activated. Consequently, the feeds running through the turntable do not necessarily lie within the axis of rotation of the turntable, but may run radially offset therefrom, preferably with different radial distances for different holding platforms.

Apart from the pneumatic contacting of each bellows of the loading platforms, a channel structure which comprises a pneumatic connection of each pneumatic pivoting device is preferably also provided within the rotary indexing table and the turntable. The individual channels allow individual activation, so that the pivoting devices can be individually actuated. The pneumatic pivoting devices may comprise one or more cylinders, so that one or more channels per pivoting device are consequently necessary. The corresponding pistons produce a stroke, which is converted into a rotating movement, which leads to the pivoting of the loading platform about the axis of rotation D'. In principle, instead of pneumatic connections, electrical connections are also conceivable, for example by way of slip rings or the like. In this case, the associated actuators are not pneumatic but electrical, for example a servo with a rod mechanism, an electric motor with a gear mechanism for producing a rotating movement, or the like.

The form of the recess represented in FIG. 7, in which the bellows is located and into which the support body is arranged, is freely selectable and preferably corresponds to the outer form of the support body in cross section. The inner side of the bellows is preferably provided with a gap with respect to a support body provided within the recess, in order to make it possible for the support body to be introduced into the recess without friction. In this case, the bellows has been emptied, whereas in the inflated state the bellows, i.e. the inner side of the bellows, moves toward the recess in order to keep the support body centered. In FIG. 7, the bellows 622 and the inner side of the recess 623 correspond to the holding device, the frame of the loading platform being represented by dashed lines.

To increase the stability, the loading platform comprises not only the channel 622b, which runs along an axis of symmetry, but also a recess 66, which serves as a counter-bearing when a rod is inserted into this recess. The cross section of the recess 696 is round, so that an inserted round rod serves as a holder when the loading platform is subjected to a vertical force, for example during the lowering of the vacuum hood. A corresponding rod, which serves as a bearing element, is preferably moved radially toward the axis of rotation D, along the axis of rotation D', in order to provide additional retention for the loading platform. The rod and the recess 696, which consequently forms a counter-bearing, serve for receiving vertical forces, in the same way as the fastening that is provided by the pivoting device.

The invention allows the processing of one-part catalyst support bodies that withstand slight mechanical loading without losing their structural integrity. The support bodies may have a volume of 0.3 l to 100 l and are preferably of porous ceramic material or ceramic material provided with a longitudinal honeycomb structure. The support bodies have a substantially cylindrical form, i.e. a constant cross section along a longitudinal axis, the cross section being circular, oval, polygonal (with or without rounded corners) and the cross section preferably running in a plane perpendicular to the longitudinal axis. The encompassing outer surface of the support body may be formed by the ceramic material or by a surround, for example of metal sheet ("canned"), which surrounds the support body. In the case of a metal sheet surround, the support body is preferably contacted exclusively on the metal sheet surround for positioning. In the case of the metal sheet surround, the ceramic support body itself may be of one or more parts, as long as the metal sheet support itself is formed as one part. The support bodies are used for processing exhaust gases from internal combustion engines, preferably exhaust gases in motor vehicles such as passenger cars, trucks, etc.

The invention claimed is:

1. A processing and positioning device for processing catalyst support bodies, comprising:
    a rotary indexing table, which comprises a turntable, which is rotatable about a longitudinal axis running in the axial direction of the turntable;
    at least one loading platform, which comprises
        a recess having an inner periphery,
        a holding device that is suited for releasably holding the catalyst support body on a cylindrical outer surface of the catalyst support body, wherein the holding device is arranged in relation to the longitudinal axis of the turntable with a radial distance away from the longitudinal axis, and the holding device is provided with an actuator comprising a bellows provided as a continuously formed envelope with a bellows feed, wherein the bellows runs along the inner periphery of the recess, and
        a loading platform feed in fluid-tight connection with an interior of the bellows;
    the at least one loading platform being connected to the turntable, wherein the at least one loading platform is taken along by the turntable when a rotation of the turntable takes place about its longitudinal axis, and
    at least one processing position, which is fixed with respect to the turntable and is away from the longitudinal axis in a radial direction by a distance which is provided in relation to the radial distance such that the at least one loading platform is arrangeable at the at least one processing position; and
    a pivoting device which pivots the at least one loading platform about a pivoting axis, the pivoting axis running along an axis of symmetry of the at least one loading platform, the fluid-tight connection to the interior of the bellows being continued through a channel within the pivoting device, wherein the loading platform feed of the at least one loading platform is configured in the form of a pin which engages in the bellows feed of the bellows and closes off with it in a fluid-tight manner.

2. The processing and positioning device according to claim 1, the at least one loading platform being connected to the turntable by way of an activatable lifting device, which is set up for displacing the at least one loading platform in the direction of the longitudinal axis.

3. The processing and positioning device according to claim 1, the at least one loading platform being connected to the turntable by way of the pivoting device, which is set up for turning the at least one loading platform about the pivot axis, which extends radially in relation to the longitudinal axis, or which is inclined in relation to the longitudinal axis by an angle of 45°-135°, 60°-120°, 80°-100°, or substantially by 90°.

4. The processing and positioning device according to claim 1, the at least one loading platform being connected to the turntable by way of mechanical connection.

5. The processing and positioning device according to claim 1, wherein the bellows has a contact surface facing an object position and is arranged on a fixed surface, the contact surface of the bellows gripping around the object position either with more than half the circumference or the full circumference or the holding device comprising a fixed pressing surface lying opposite the contact surface.

6. The processing and positioning device according to claim 5, the actuator comprising the bellows, and the bellows having an access, wherein the recess is a complementary recess in a frame into which the access extends and which is formed from inelastic material, grips at least partially around the object position and is provided by the at least one loading platform, and the access being connected to the complementary recess by way of a separable fluid-tight connection, the bellows being formed as a continuously formed tube of an elastic material, the frame providing the fixed surface as a continuously formed inner surface of the frame which is completely lined with the tube, and the frame having a fluid connection, which is connected by way of the fluid-tight connection to an inner space of the bellows for the transmission of fluid.

7. The processing and positioning device according to claim 1, the at least one processing position being provided by at least one processing station, which belongs to the processing and positioning device, and the at least one processing station comprising at least one of the following stations:
    a weighing station, which comprises a force sensor which is set up for sensing the force of the weight of the catalyst support body;
    a coating station, which comprises a one-, two- or multi-part coating chamber that can be is configured to be closed off from the surroundings and is intended for receiving the catalyst support body, a feeding device, which is set up for introducing catalyst material into a catalyst support body within the coating chamber;
    a blowing-out station, which comprises a blowing-out chamber for receiving the catalyst support body, which are set up and connected to the blowing-out chamber in order to subject the catalyst support body to a gas pressure or a gas pressure gradient, the blowing-out station comprising a collector, which is set up and provided on the blowing-out chamber in order to collect catalyst material escaping from a catalyst support body within the blowing-out chamber;
    a loading station, which keeps a supply of catalyst support bodies, and a positioning unit, which is set up for providing catalyst support bodies so as to be gripable by the holding device; and
    an unloading station, which is formed separately from the loading station or together with it and which comprises a depository, which is set up for receiving processed catalyst support bodies.

* * * * *